(No Model.)

M. W. ILES.
PROCESS OF RECOVERING METALS FROM COPPER ALLOYS.

No. 484,021. Patented Oct. 11, 1892.

WITNESSES:

INVENTOR:

UNITED STATES PATENT OFFICE.

MALVERN W. ILES, OF DENVER, COLORADO.

PROCESS OF RECOVERING METALS FROM COPPER ALLOYS.

SPECIFICATION forming part of Letters Patent No. 484,021, dated October 11, 1892.

Application filed June 24, 1892. Serial No. 437,816. (No model.)

*To all whom it may concern:*

Be it known that I, MALVERN W. ILES, of Denver, county of Arapahoe, State of Colorado, have invented a certain new and useful Process for Recovering Metals from Copper Alloys, of which the following is a true and exact description, reference being had to the accompanying drawings, which form a part of this specification.

My invention relates to the recovery of the precious metals from jewelers' sweeps or similar alloys with copper, and has for its object to provide a quick, simple, and cheap method for recovering the precious metals from such material. This I accomplish by first bringing the alloy into a fine state of division, flattening all large pieces into thin sheets by passing them through rolls or beating them out under a hammer. The alloy thus treated is then brought into intimate mixture with sulphide of iron, either native or artificial. Preferably I use about seven times as much, by weight, of the iron sulphide as of the alloy, and preferably, also, I use with this mixture a suitable flux, such as borax. The mixture is then thoroughly fused and maintained in a state of fusion for a time, which will depend on the quantity of material under treatment. In experiments I have made with, say, twenty-five ounces of sweeps I have found it desirable to maintain the mixture under fusion for about twenty minutes. The copper having a stronger affinity for sulphur than iron will, to a certain extent, decompose the iron sulphide and form a very fusible iron and copper matte from which all the precious metals will, so to speak, "drain," forming in the bottom of the crucible a button of gold, silver, or gold and silver, as the case may be. On cooling the crucible may be broken and the matte separated readily from the metal button, which under ordinary circumstances will be found perfectly pure and free from alloy with base metals.

Figure 1:
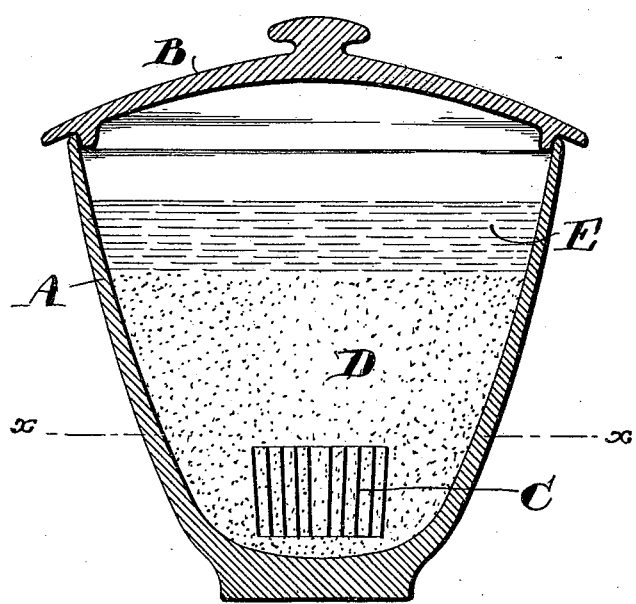
Figure 2:
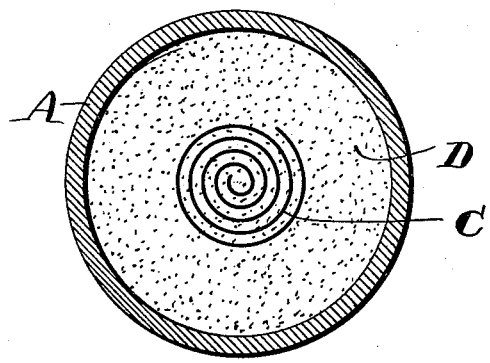

Referring to the drawings, Figure 1 is a vertical section, and Fig. 2 a horizontal section of a crucible, charged with scrap and sulphide.

A represents a crucible, B its lid, and C a coil of the alloy rolled or beaten out thin.

D is the iron sulphide with which may be mixed finely-divided particles of the alloy, and E is a layer of borax—say about half an inch in depth—placed over the top of the sulphide.

In treating the ordinary sweeps I pass the sweepings through an ordinary sieve of, say, twenty to thirty mesh. The coarse material, which will not pass through the sieve, is then flattened out on an anvil by a gold-beater's hammer in rolls or in any convenient way and the sheets rolled into a coil or folded into a bundle, which is placed at the bottom of a Hessian or graphite crucible, and then covered by the sulphide of iron with which I have previously thoroughly incorporated the sweeps which passed through the sieve. I then tap down the mass carefully and cover it with borax. The crucible is then placed in a suitable furnace and its contents brought to a complete fusion with the results already noted.

Having now described my invention, what I claim as new, and desire to secure by Letters Patent, is—

1. The method of recovering the precious metals from jewelers' sweeps or equivalent material, as described, which consists in making an intimate mixture of the alloy with sulphide of iron and fusing the mixture to form a fusible matte of copper and iron and a residue of precious metals.

2. The method of recovering the precious metals from jewelers' sweeps or equivalent material, as described, which consists in making an intimate mixture of the alloy with sulphide of iron, adding a flux to said mixture, and fusing the mixture to form a fusible matte of copper and iron and a residue of precious metals.

3. The method of recovering the precious metals from jewelers' sweeps or equivalent material, as described, which consists in flattening all large pieces of the alloy into thin sheets, covering said sheets previously coiled or folded with sulphide of iron, and fusing the mixture to form a fusible matte of copper and iron and a residue of precious metals.

4. The method of recovering the precious metals from jewelers' sweeps or equivalent material, as described, which consists in flattening all large pieces of the alloy into thin sheets, covering said sheets previously coiled or folded with sulphide of iron in admixture with finely-divided particles of the alloy, and fusing the mixture to form fusible matte of copper and iron and a residue of precious metals.

MALVERN W. ILES.

Witnesses:
W. L. HOYT,
J. H. RUSSELL.